(12) United States Patent
Monge

(10) Patent No.: US 6,398,465 B1
(45) Date of Patent: Jun. 4, 2002

(54) INSTALLATION JIG FOR LOCKSETS

(75) Inventor: Valery Monge, Yorba Linda, CA (US)

(73) Assignee: Emhart LLC, Newark, DE (US)

( * ) Notice: Subject to any disclaimer, the term of this patent is extended or adjusted under 35 U.S.C. 154(b) by 20 days.

(21) Appl. No.: 09/656,957

(22) Filed: Sep. 7, 2000

(51) Int. Cl.⁷ .......................... B23B 45/14; B23B 31/07; B23B 35/00

(52) U.S. Cl. ................... 408/1 R; 408/115 R; 279/143; 279/76

(58) Field of Search .................. 408/115 R, 115 B, 408/103, 108, 97, 72 R, 72 B; 33/197; 279/143–145, 76, 89, 907

(56) References Cited

U.S. PATENT DOCUMENTS

| 2,348,116 A |   | 5/1944 | Dzus |   |
|---|---|---|---|---|
| 2,679,771 A |   | 6/1954 | Schlage |   |
| 2,763,299 A |   | 9/1956 | Cerf, Jr. |   |
| 2,938,554 A | * | 5/1960 | Schlage | 33/197 |
| 3,293,954 A | * | 12/1966 | Russell et al. | 408/97 |
| 3,302,674 A |   | 2/1967 | Russell et al. |   |
| 3,635,571 A | * | 1/1972 | Roberts et al. | 408/97 |
| 4,148,593 A |   | 4/1979 | Clark |   |
| 4,248,554 A |   | 2/1981 | Boucher et al. |   |
| 4,294,567 A |   | 10/1981 | Wiggins |   |
| 4,306,823 A |   | 12/1981 | Nashlund |   |
| 4,331,411 A |   | 5/1982 | Kessinger et al. |   |
| 4,385,755 A |   | 5/1983 | Mawer |   |
| 4,445,277 A |   | 5/1984 | Keefe |   |
| 4,575,059 A |   | 3/1986 | Blaine |   |
| 4,588,335 A |   | 5/1986 | Pearson, Jr. |   |
| 4,594,032 A |   | 6/1986 | Warburg |   |
| 4,669,926 A |   | 6/1987 | Wilcox, Jr. |   |
| 4,669,928 A |   | 6/1987 | Mediavilla |   |
| 4,710,075 A |   | 12/1987 | Davison |   |
| 4,715,125 A |   | 12/1987 | Livick |   |
| 4,813,826 A |   | 3/1989 | Riedel |   |
| 4,924,576 A |   | 5/1990 | Schiller |   |
| 4,957,257 A |   | 9/1990 | Gonzalez |   |
| 5,046,901 A |   | 9/1991 | Taylor |   |
| 5,076,742 A |   | 12/1991 | Lee et al. |   |
| 5,116,170 A |   | 5/1992 | Palmer et al. |   |
| 5,146,961 A |   | 9/1992 | Schoeller |   |
| 5,158,406 A |   | 10/1992 | Ulinskas |   |
| 5,174,693 A |   | 12/1992 | Lee et al. |   |
| 5,222,845 A |   | 6/1993 | Goldstein et al. |   |
| 5,690,452 A |   | 11/1997 | Baublits |   |
| 5,697,601 A |   | 12/1997 | Gurule |   |
| 5,762,115 A |   | 6/1998 | Shouse |   |
| 5,782,006 A |   | 7/1998 | Erway et al. |   |
| 5,868,532 A |   | 2/1999 | Spenser |   |
| 5,915,891 A |   | 6/1999 | Fridman |   |
| 5,946,809 A |   | 9/1999 | Bright |   |
| 5,957,634 A |   | 9/1999 | Carpinetti |   |

* cited by examiner

Primary Examiner—Steven C. Bishop
(74) Attorney, Agent, or Firm—Richard J. Veltman; John D. Del Ponti

(57) ABSTRACT

An installation jig includes a pair of jaws and a latch guide coupled together by an adjusting mechanism. The jig includes a pair of backset spacers mounted to the latch guide rotational movement between a first backset position and a second backset position. A detent mechanism maintains each backset spacer in a selected backset position and, when combined with the rotational movement, provides a tool-free backset operation. The jig also includes a pair of removable in-line arms to provide the capability to perform a standard door prep on metal and wood doors. In addition, a novel drill bit adapter is disclosed.

32 Claims, 7 Drawing Sheets

INSTALLATION JIG FOR LOCKSETS

The present invention relates generally to jigs and fixtures and particularly to installation jigs for facilitating the installation of a lock in a door. More particularly, the invention relates to installation jigs that provide for installing a lockset in either a wood door or a metal door, provides for readily and easily selecting the proper backset, and automatically aligns a latch guide with the center of the door edge for drilling a latch hole.

BACKGROUND OF THE INVENTION

Installation jigs for installing locksets are known in the art. For example, U.S. Pat. No. 5,915,891 to Fridman, U.S. Pat. No. 5,762,115 to Shouse, U.S. Pat. No. 5,222,845 to Goldstein et al., and U.S. Pat No. 5,116,170 to Palmer et al. all relate to installation jigs. U.S. Pat. No. 5,915,891 to Fridman relates to a drill guide and method for installing a door lock. However, Fridman's drill guide is limited to drilling transverse holes and does not provide for drilling a latch hole in the edge of the door. Moreover, Fridman's drill guide must be held in position manually or the installer must carry a clamp for the purpose. Unfortunately, a clamp is both inconvenient to carry and awkward to use while trying to hold the guide in the proper position. U.S. Pat. No. 5,762,115 to Shouse relates to a door template for use with a drill and a router. Shouse's template is limited to routing out a recess for receiving the edge plate of a latch. In addition, Shouse's guide must be held in place manually or the installer must use a clamp. U.S. Pat. No. 5,222,845 to Goldstein et al. relates to an adjustable drill guide for door handles and locks. Unfortunately, the guide holes for drilling the latch hole in the door edge can only accommodate a door having a particular thickness, and a second drill guide must be used for a second door having a different thickness. In addition, the drill guide uses interchangeable plates to provide guide holes for the transverse holes. If different backsets are required, the installer must partially disassemble the drill guide and reassemble the guide with a different plate. U.S. Pat. No. 5,116,170 to Palmer et al. relates to a drill jig for preparing a door to receive a cylindrical lock. However, Palmer's jig is only useful for drilling holes to accommodate through-bolts to retain a lockset in place. Moreover, a transverse hole must first be bored in the door, presumably using another jig, before Palmer's drill jig can be used.

To overcome the above-recited deficiencies, self-clamping jigs for drilling both transverse holes and latch holes have been developed. For example, U.S. Pat. No. 4,715,125 to Livick relates to a door lock drilling template and includes drill guides both for a transverse hole and a latch hole. Unfortunately, there is no provision for adjusting the position of the latch hole drill guide to accommodate doors with different thicknesses. Livick's template is configured to accommodate a 1¾-inch thick door and requires a shim to accommodate a standard 1⅜-inch thick residential interior door. In addition, although the transverse hole drill guides can be moved to accommodate various backsets, to do so the guides must be removed from the template, repositioned, and reassembled on the template, which is inconvenient and provides an opportunity to misalign the guides.

U.S. Pat. No. 4,331,411 to Kessinger et al. relates to a door lock drill assembly. Kessinger et al. disclose drill guides for both transverse holes and latch holes but is designed for use on a conventional exterior door. The '411 patent does not disclose any adjustment mechanism for accommodating doors with different thicknesses. In order to accommodate a standard interior door, which is thinner than an exterior door, an adapter must be installed on the assembly to properly align the latch guide. It is inconvenient to carry an adapter, which can be lost or misplaced.

U.S. Pat. No. 4,306,823 to Nashlund relates to a boring and routing jig for cylindrical doorknob assemblies. Nashlund does not disclose any provision for changing the backset. Instead, Nashlund discloses changeable templates, which are subject to possible improper installation and misalignment. Moreover, the method of aligning the latch guide is inaccurate and cumbersome, requiring multiple adjustments of a pair of C-clamps.

U.S. Pat. No. 4,248,554 to Boucher et al. relates to a door boring jig system. The disclosed jig includes a cumbersome backset adjustment mechanism that requires an installer to align a small hole with a pin on each of two backset-adjusting units.

U.S. Pat. No. 3,302,674 to Russell et al. relates to a unit lock installation jig. The '674 patent allows for marking the proper position for the latch hole, but does not provide a latch guide for drilling the hole. Moreover, the '674 patent only provides for a single backset.

U.S. Pat. No. 2,763,299 Cerf relates to a lock installation tool. Unfortunately, Cerf's tool only provides for a single backset.

U.S. Pat. No. 2,679,771 to Schlage relates to a boring jig for doors. Schlage discloses for accurately marking a door for boring holes to install a lock, but does not include drill guides to ensure that the holes are drilled properly.

None of the above-cited patents provides an installation jig with the advantageous combination of quick and easy backset adjustment, automatic centering of a latch guide, multiple in-line arms to permit standard door prep on metal doors as well as wood doors, and the capability of performing standard 1½ inch door preps and 2⅛ inch door preps.

SUMMARY OF THE INVENTION

The present invention overcomes the above-noted deficiencies and others in conventional door lock installation jigs by providing a lockset installation jig comprising a first jaw and a second jaw, a latch guide disposed at least partially between the first and second jaws, and an adjuster coupled to the first and second jaws and the latch guide. A first removable in-line arm is coupled to the first jaw at a first location and includes a first guide bore, the first in-line arm defining a first distance between the first guide bore and the door. A backset spacer is coupled to the latch guide for movement between a first backset position and a second backset position. Preferably, the backset spacer is rotatable and includes a detent mechanism to retain the backset spacer in one of the first backset position and the second backset position. In addition, the rotatable backset spacer further includes indicia for indicating an amount of backset.

The installation jig further includes a second removable in-line arm having a second guide bore, the second in-line arm defining a second distance between the second guide bore and the door. The second removable in-line arm is coupled to the first jaw at the first location in place of the first in-line arm. Preferably, the first jaw includes a recess and the first and second in-line arms include a base portion configured to fit in the recess when coupled to the first jaw.

The present invention also provides a method of using a lockset installation jig. The method comprises the steps of providing a lockset installation jig having first and second jaws, a removable first in-line arm coupled to the first jaw at a first location, and at least one backset spacer, removing the first in-line arm, mounting a second in-line arm at the first location, and mounting the installation jig on a door.

The method further includes the step of setting the at least one backset spacer to a desired backset, wherein the step of setting the at least one backset spacer includes the step of rotating the backset from a first backset position to a second backset position.

The present invention further provides for an installation jig kit comprising an installation jig, a plurality of hole boring tools, a first in-line arm and a second in-line arm, and at least one backset spacer. The installation jig includes a first jaw, a second jaw, a latch guide and an adjusting mechanism coupled to the first jaw, the second jaw and the latch guide.

The plurality of hole boring tools includes a plurality of tools for providing a standard 1½ inch door prep including a 1½ adapter ring and a 1½ multi-spur bit. The plurality of hole boring tools also includes a plurality of tools for providing a standard 2⅛ inch door prep, including a 2⅛ inch multi-spur bit and a 2⅛ inch hole saw.

Preferably, the jig kit further includes a drill bit adapter for coupling the hole boring tools to a drill. The drill bit adapter includes a body having a longitudinal axis and a channel disposed in parallel spaced-apart relation to a longitudinal axis and a cap coupled to the body, wherein the body and cap cooperate to define a catch-receiving cavity therebetween. A catch is disposed in the cavity and a spring is disposed in the channel and includes a first end coupled to the body and a second end extending into the cavity and engaging the catch. A push button is disposed in the cap to actuate the catch.

The installation jig kit further comprises a carrying case, a strike locator, a 1 inch spade bit, a plurality of mortising tools, and a template measurement guide.

Other features and advantages of the invention will become apparent from the following portion of this specification and from the accompanying drawings which illustrate a presently preferred embodiment incorporating the principles of the invention.

DETAILED DESCRIPTION OF THE DRAWINGS

Figure 1:
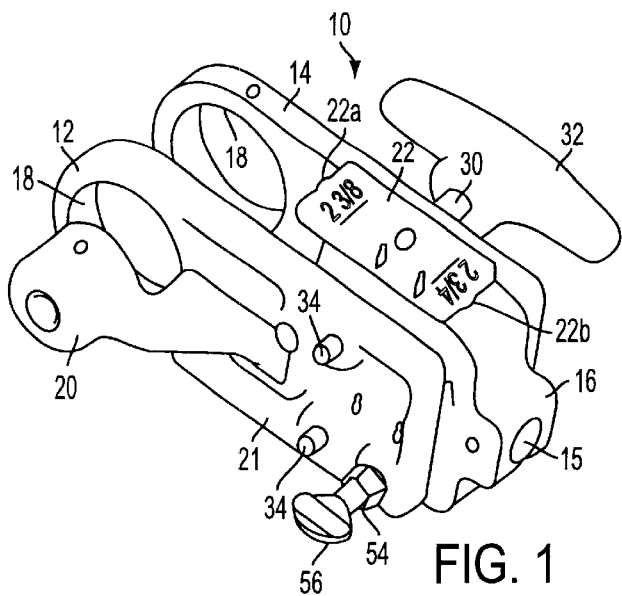
FIG. 1 is a perspective view of an installation jig according to the present invention.
Figure 2:
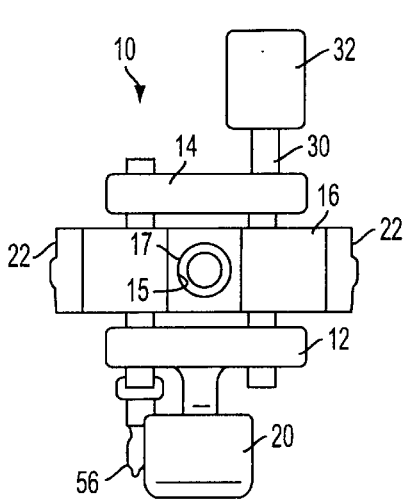
FIG. 2 is an end view of the jig illustrated in FIG. 1.
Figure 3:
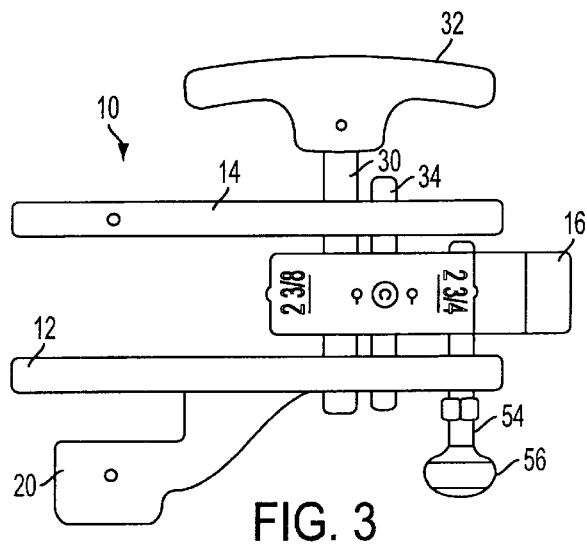
FIG. 3 is a top view of the jig illustrated in FIG. 1.
Figure 4:
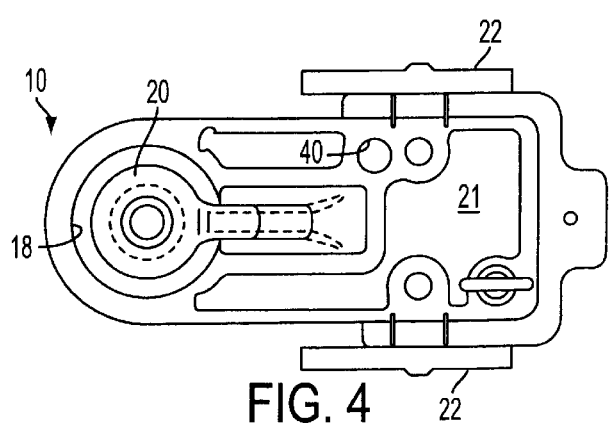
FIG. 4 is a side view of the jig illustrated in FIG. 1.

A lockset installation jig 10 is illustrated in FIGS. 1–5. The jig 10 includes a first jaw 12, a second jaw 14, and a latch guide 16 disposed between the jaws 12, 14. The jaws 12, 14 and the latch guide 16 cooperate to define a generally U-shaped clamp for attachment to a door (not shown). Each of the jaws 12, 14 includes a hole saw-receiving aperture 18. The latch guide 16 includes a drill-receiving bore 15 with a bushing 17. An in-line arm 20 is attached to the first jaw 12 and extends outwardly from the outer surface 21 of the jaw 12. Upper and lower backset spacers 22 are rotatably coupled to the latch guide 16 and each backset spacer 22 includes indicia to indicate the amount of backset to be applied. An adjustment mechanism couples the jaws 12, 14 to the latch guide 16 for opening and closing movement of the jaws 12, 14 to clamp the installation jig 10 to a door (not shown).

The adjustment mechanism includes a threaded shaft 30, a handle 32 coupled to the threaded shaft 30, and a pair of smooth guide pins 34. The threaded shaft 30 and the guide pins 34 extend through the jaws 12, 14 and the latch guide 16. The threaded shaft 30 includes a first portion 36 with right-handed threads for engaging a threaded aperture 40 in the first jaw 12 and a second portion 37 with left-handed threads for engaging a threaded aperture 42 in the second jaw 14. A center, unthreaded portion 42 includes an annular groove 44 and is disposed in an unthreaded aperture 46 in the latch guide 16. A retaining pin 45 extends into the latch guide 16 to intersect the groove 44 to allow rotation of the shaft 30 while laterally retaining the shaft 30 in the latch guide 16. The guide pins 34 are disposed in unthreaded apertures 50 formed in the first and second jaws 12, 14 and the latch guide 16. An adjuster screw 54 has a turnpiece 56 at a proximal end 60 and engages a threaded aperture 62 in the first jaw 12. The distal end 64 extends through an unthreaded aperture 60 in the latch guide 16 and abuts the second jaw 14 when the jaws 12, 14 are parallel to each other. A locking nut 66 is disposed on the screw 54 between the turnpiece 56 and the first jaw 12.

To adjust the installation jig 10, the installer turns the handle 32 in a first direction, thereby turning the threaded shaft 30. The threaded shaft 30 pulls the jaws 12, 14 closer together, with the jaws 12, 14 moving along the guide pins 34. Turning the handle 32 in the opposite direction moves the jaws 12, 14 apart. The installer turns the adjusting screw 54 to align the jaws 12, 14 in a parallel relation with the faces of the door to ensure a tight clamping action without causing damage to the door. The locking nut 66 is moved along the screw 54 to set the parallel relationship of the jaws 12, 14.

Figure 5:
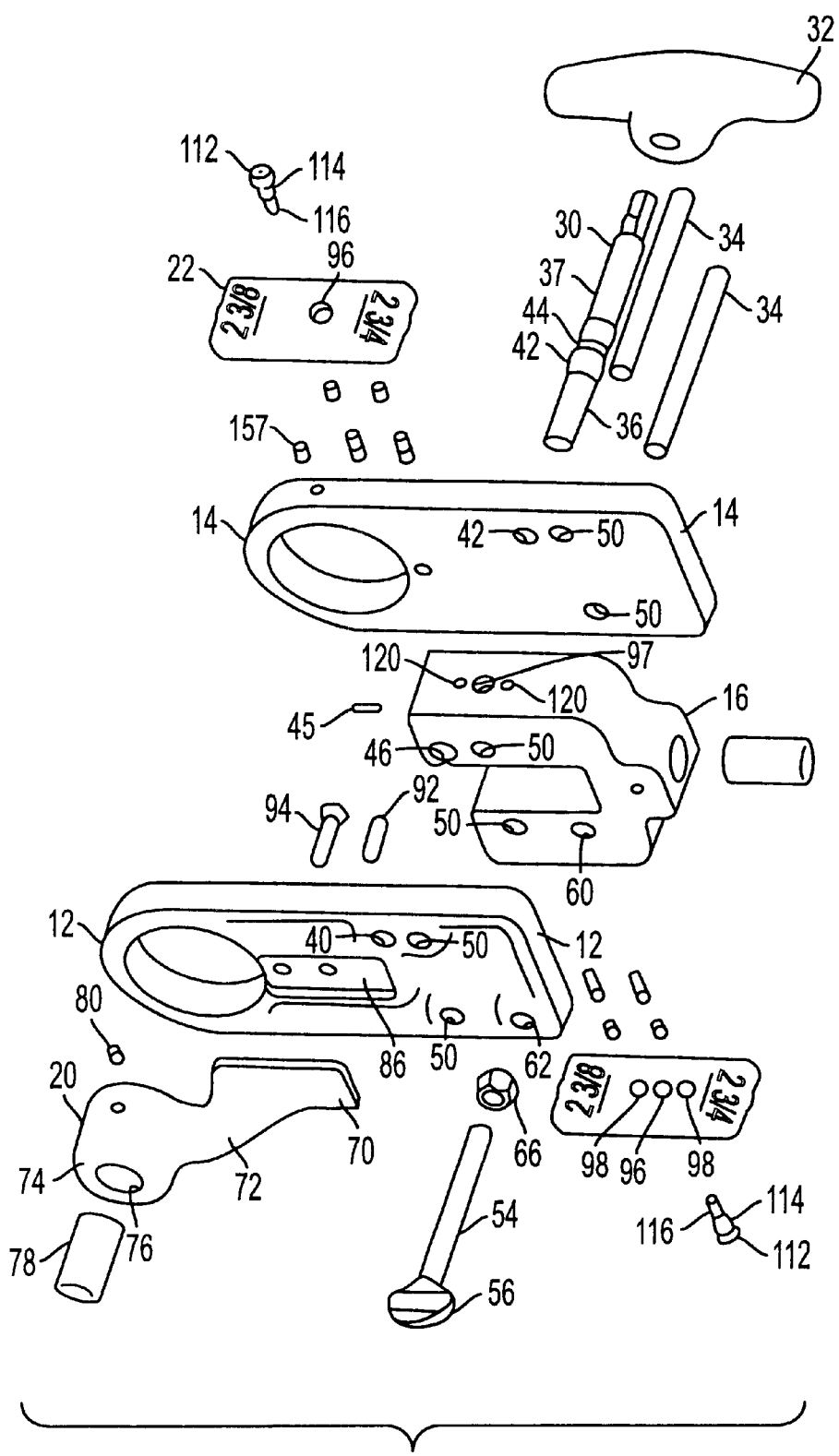
FIG. 5 is an exploded view of the jig illustrated in FIG. 1.
Figure 6:
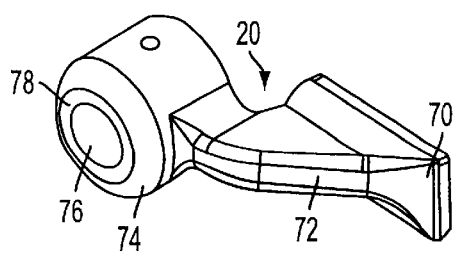
FIG. 6 is a perspective view of an in-line arm for use in the jig illustrated in FIG. 1.
Figure 7:
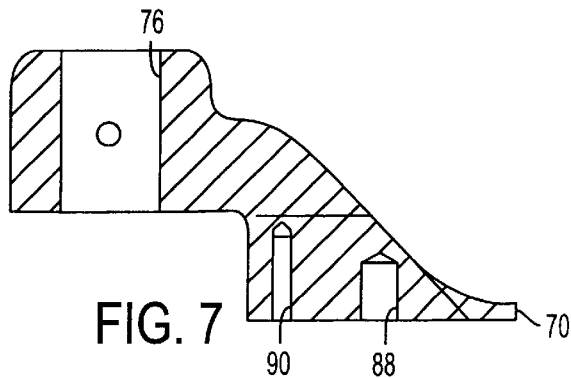
FIG. 7 is a section view through the center of the in-line arm of FIG. 6.

The in-line arm 20, illustrated in FIGS. 6–7, includes a base portion 70, a supporting arm 72 and a drill guide portion 74 having a shank bore 76 extending therethrough, with the shank bore 76 being co-axially aligned with the hole saw-receiving aperture 18. A shank bushing 78 is installed in the shank bore 76 and is held in place by set screw 80 (FIG. 5). A dowel receiving bore 82 and a threaded screw-receiving bore 84 extend from the bottom of the in-line arm 20 through the base portion 70 and into the supporting arm 72. Preferably, the first jaw 12 includes a recess 86 configured to receive the base portion 70 of the in-line arm 20 and includes a dowel-receiving bore 88 and a unthreaded screw-receiving bore 90. The dowel-receiving bore 88 and the screw-receiving bore 90 in the recess 86 are aligned with the dowel-receiving bore 82 and the threaded screw-receiving bore 84, respectively. A dowel 92 and retaining screw 94 attach the in-line arm 20 to the first jaw 12.

Figure 8:
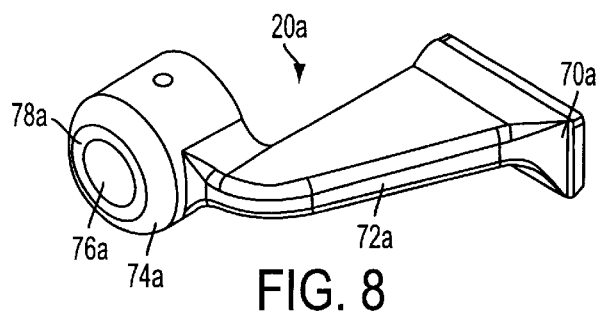
FIG. 8 is a perspective view of an alternative in-line arm for use in the jig illustrated in FIG. 1.

A second in-line arm 20a, illustrated in FIG. 8, is substantially similar in design to the in-line arm 20 illustrated in FIGS. 6–7, including a base portion 70a, and a drill guide portion 74a having a shank bore 76a extending therethrough, but includes an elongated supporting arm 72a. The base portion 70a is substantially identical to base portion 70, including a dowel-receiving bore (not shown) and threaded screw-receiving bore (not shown) configured to receive the dowel 92 and retaining screw 94, respectively, when the in-line arm 20a is disposed in the recess 86. The alternative in-line arm 20a provides a greater distance between the shank bore 76 and the door than available with the supporting arm 72. The increased distance allows for the use of a hole saw designed for use with thicker doors or metal doors.

Figure 9:
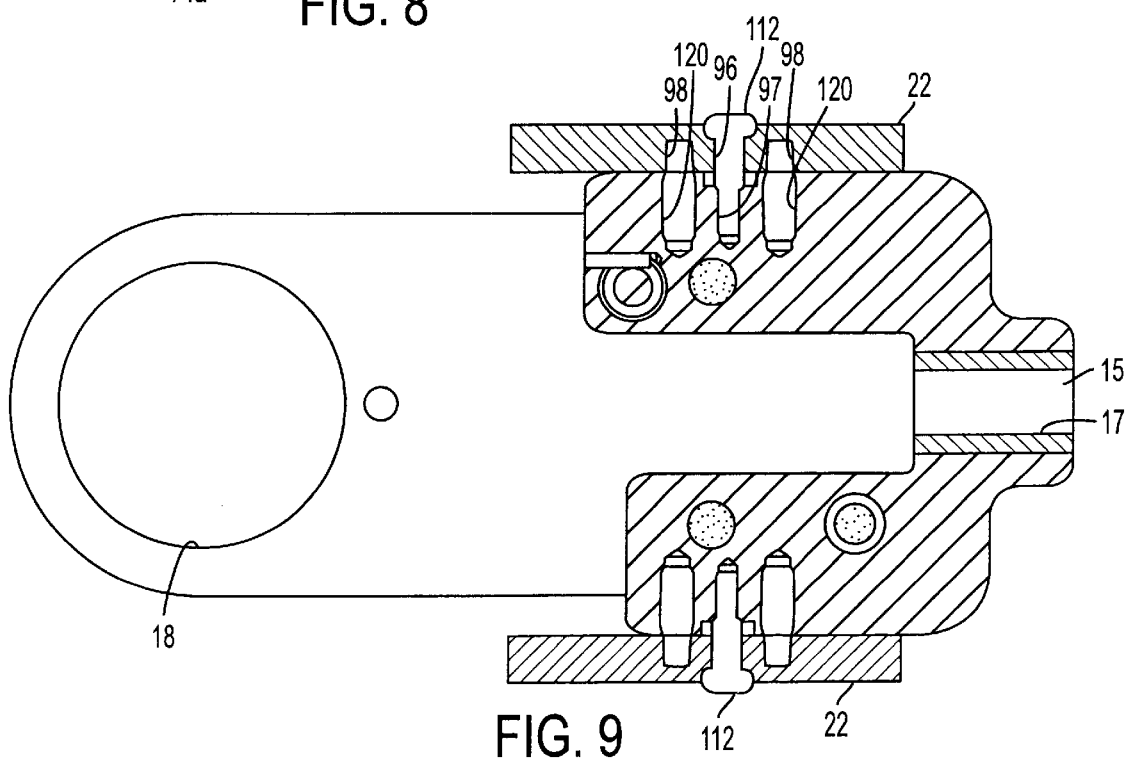
FIG. 9 is a section view taken through the latch guide and backset spacers.
Figure 10:
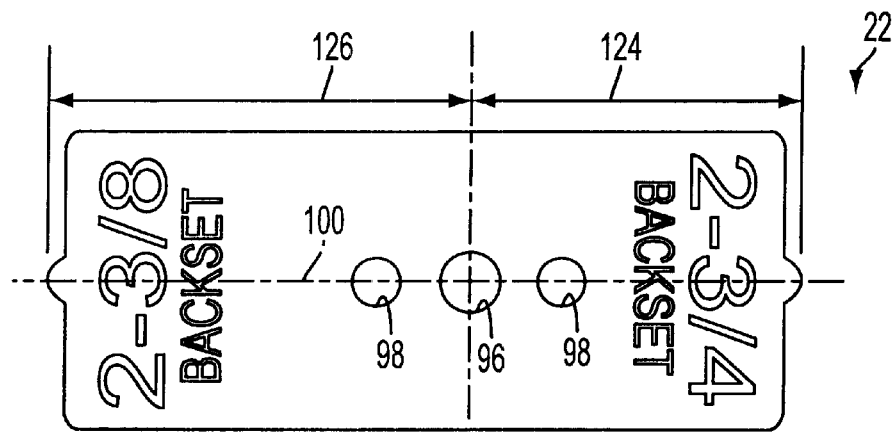
FIG. 10 is a plan view of a backset spacer.

The backset spacer 22 is illustrated in FIGS. 9–10 and includes a pivot bore 96 and a pair of detent bores 98, all of which are disposed along the longitudinal axis 100 of the spacer 22, with the pivot bore 96 being offset from the center of the spacer 22. The backset spacer 22 is coupled to the latch guide 16, as illustrated in FIG. 9, by a pivot bolt 112. Preferably, the pivot bolt 112 includes an unthreaded upper portion 114 that fits in the pivot bore 96 and a threaded lower portion 116 that screws into a receiving bore 97 in the latch guide 16. The detent bores 98 are equally spaced from the pivot bore 96 and are configured to align with slightly larger detent bores 120 in the latch guide 16 to provide a conventional spring-and-ball detent mechanism.

When the spacer 22 is in a first position, as illustrated in FIG. 1, the offset of the pivot bore 96, the distance from the first end 22a of the spacer 22 to the center of the hole saw-receiving aperture 18 provides a 2⅜ inch backset. When the spacer 22 is rotated 180 degrees, the distance from the second end 22b of the spacer 22 to the center of the hole saw-receiving aperture 18 provides a 2¾ inch backset.

Preferably, the pivot bore offset provides a first distance 124 from the center of the pivot bore 96 to a first end of the spacer of 1⅜ inches and a second distance 126 from the center of the pivot bore 96 to a second end of the spacer of 1¾ inches. However, it will be understood that any number of distances will work to provide the desired backsets, depending on the length of the spacer 22, the position of the pivot bore 96, and pivot bolt 112.

The installation jig 10 includes a plurality of drill bits for boring holes. With the exception of the working heads for hole saws, multi-spur bits, and spade bits, the drill bits are substantially similar in construction. Accordingly, the following discussion will describe a hole saw assembly 114, but it should be understood that the description applies to all of the drill bits of the installation jig 10.

Figure 11:
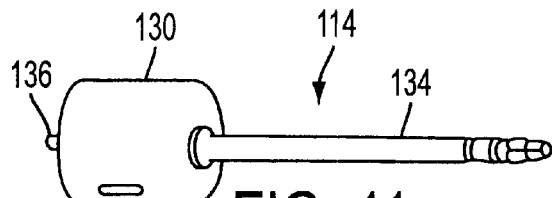
FIG. 11 is perspective view of a hole saw assembly.
Figure 12:
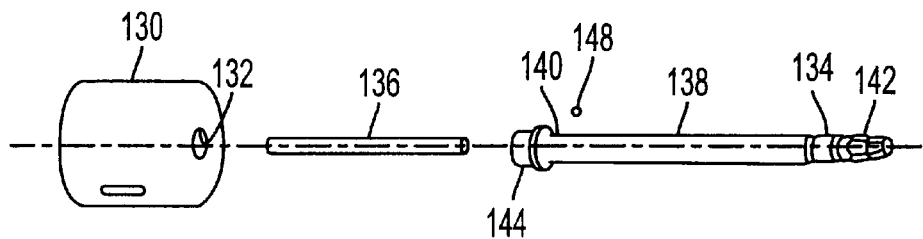
FIG. 12 is an exploded perspective view of the hole saw assembly of FIG. 11.
Figure 13:
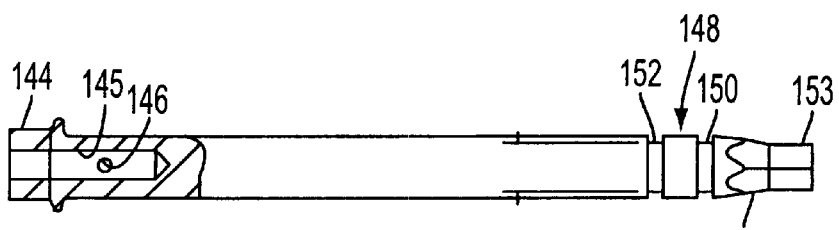
FIG. 13 is a partial section view of a mandrel for use in the hole saw assembly of FIG. 11.
Figure 14:
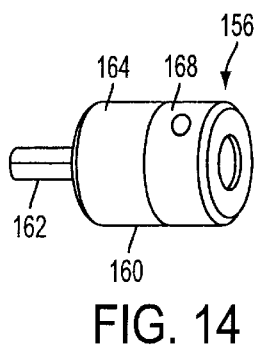
FIG. 14 is a perspective view of a drill bit adapter for use with the installation jig of FIG. 1.
Figure 15:
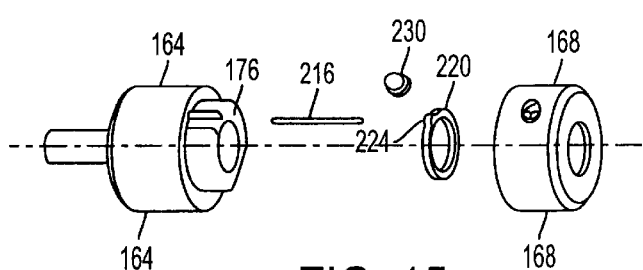
FIG. 15 is an exploded view of the drill bit adapter of FIG. 14.

A hole saw assembly 114 for use with the installation jig 10 is illustrated in FIGS. 11–13. The saw assembly 114 includes a mandrel 134, a drill bit 136, and a circular saw blade 130 with a threaded central bore 132. The mandrel 134 includes a shaft 138 having a first end 140 and a second end 142. The first end 140 includes an externally threaded portion 144, an axial bore 145 extending partially along the longitudinal axis of the shaft 138, and a transverse bore 146 that intersects the axial bore 145. The axial bore 145 receives the drill bit 136 and the transverse bore 146 receives a set screw 148 for retaining the drill bit 136 in the axial bore 145. The threaded portion 144 receives the threaded central bore 132 of the circular saw blade 130. The second end 142 of the shaft 138 includes a first portion 148 having a circular cross section and first and second annular grooves 150, 152, respectively, and a tip portion 153 having a hexagonal cross section. A tapered transition portion 154 joins the first portion 148 and the tip portion 153. In addition to the hole saw assembly 114, the installation jig 10 uses a variety of drill bits, including multi-spur bits and a spade bit. All of the bits include a shaft that is substantially identical to shaft 138, including the first and second grooves 150, 152 and the tapering tip portion 153. Preferably, a snap ring 155 (FIG. 23) is installed in the second groove 152 of each shaft 138.

Figure 16:
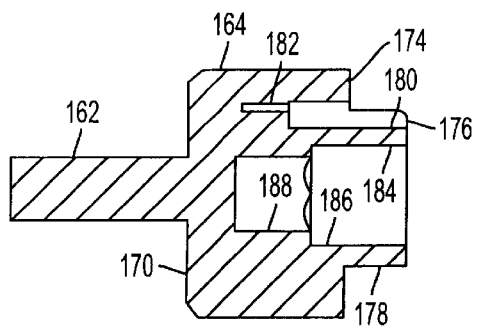
FIG. 16 is a section view through the body of the drill bit adapter of FIG. 14.
Figure 17:
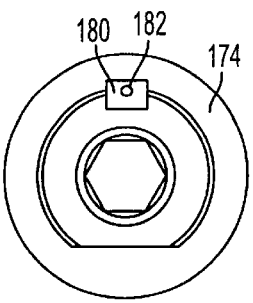
FIG. 17 is a top plan view of the body.
Figure 18:
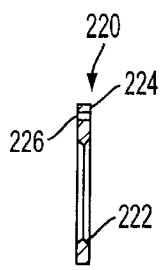
FIG. 18 is a section view through an adapter catch for use with the adapter of FIG. 14.
Figure 19:
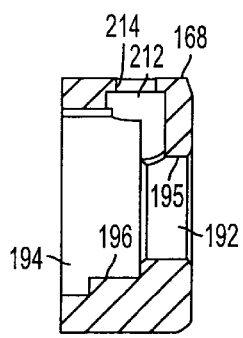
FIG. 19 is a section view through the cap of the adapter of FIG. 14.
Figure 20:
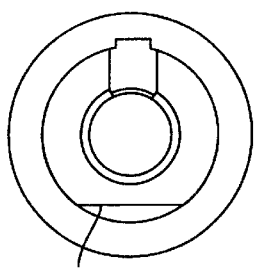
FIG. 20 is a bottom plan view of the cap.

A drill bit adapter 156, illustrated in FIGS. 14–21, couples the hole saw assembly 114, or a drill bit or multispur bit or the like, to a power tool, such as a drill. The adapter 156 includes a bit-receiving portion 160 and a shank 162 extending axially from the bit-receiving portion 160 for engaging a conventional chuck of a power tool. The bit-receiving portion 160 includes a body 164 and a cap 168. The body 164 includes a bottom surface 170, from which the shank 162 extends, and an upper surface 174. A generally cylindrical projection 176 extends axially from the upper surface 174 and includes a flat 178 and a channel 180 extending parallel to, and spaced-apart from, the longitudinal axis of the adapter 156. The channel 180 extends along the length of the cylindrical projection 176 and partially into the body 164. A small diameter bore 182 extends axially from the end of the channel 180 into the body 164. The small diameter bore 182 is offset radially outwardly from the center of the channel 180, as illustrated in FIGS. 16–17. A central bore 184 extends axially through the cylindrical projection 176 and partially through the body 164. The central bore 184 includes a first bore portion 186 with a circular cross section and second bore portion 188 with a hexagonal cross section. The first bore portion 186 is configured to receive the first portion 148 of the saw assembly shaft 138, and the second bore portion 188 is configured to receive the tip portion 153 of the shaft 138.

The cap 168 includes a central bore 192 extending therethrough. The central bore 192 includes body-receiving portion 194 and a shaft-receiving portion 196. The shaft-receiving portion 196 has a diameter slightly larger than the diameter of the shaft 138. The body-receiving portion 194 has a diameter substantially equal to the diameter of the cylindrical projection 176 and includes a flat 196 configured to abut the flat 178 of the cylindrical projection 176 to ensure proper alignment of the cap 168 on the body 164. The depth of the body-receiving portion 194 is greater than the height of the cylindrical projection 176, thus providing an annular catch-receiving cavity 198 (FIG. 21) when the body 164 and cap 168 are assembled. A button-receiving bore 212 extends transversely from the outside wall of the cap 168 to the central bore 192 and intersects both the body-receiving portion 194 and the shaft-receiving portion 196. The button-receiving bore 212 includes an inwardly extending annular shoulder 214 at the outside wall of the cap 168.

The adapter 156 also includes a wire spring 216 and an annular catch 220. The wire spring 216 is an elongated resilient member configured to fit in the small diameter bore 182 and be disposed in the channel 180. Since the small diameter bore 182 is offset from the center of the channel 180, the wire spring 216 is free to bend in the channel 180 toward the center of the adapter 156. The catch 220 is essentially a beveled washer with a beveled surface 222 and a projection 224 extending radially outwardly therefrom. The projection 224 includes a small aperture 226 for receiving the wire spring 216. The diameter of the central aperture of the catch 220 is substantially equal to the diameter of the central bore 192. The adapter 156 further includes a push button 230 to be operatively positioned in the button-receiving bore 212. The push button 230 includes a flange 232 that operatively abuts the annular shoulder 214 of the button-receiving bore 212 to retain the push button 230 in the bore 212.

Figure 21:
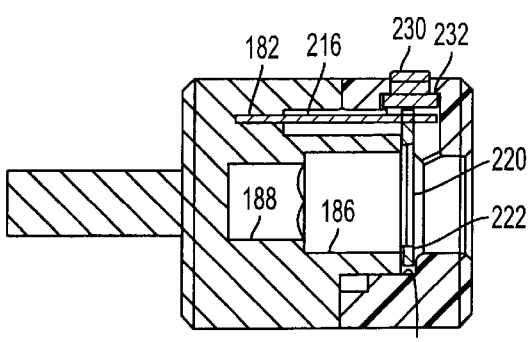
FIG. 21 is a section view through the assembled adapter of FIG. 14.

As illustrated in FIG. 21, when the adapter 156 is assembled, the wire spring 216 extends from the small diameter bore 182 through the aperture 226 in the catch 220. The catch 220 is disposed in the annular catch-receiving cavity 198 with the beveled surface 222 facing away from the body 164 of the adapter 156. The projection 224 abuts the push button 230, which is disposed in the button-receiving bore 212.

In operation, the shaft 138 of the hole saw assembly 114, or a drill bit or multispur bit or the like, is inserted in the central bore 192. During insertion, the tapered transition portion 154 moves the catch 220 to align the central aperture of the catch 220 with the central bore 192 of the cap 168. As the tip portion 153 becomes fully seated in the hexagonal second bore portion 188, the catch 220 enters the first groove 150 under the biasing force of the wire spring 216 to retain the shaft 138 in the adapter 156. Because of the spacing between the first and second grooves 150, 152, the second groove 152 is operatively disposed outside of the adapter 156. To release the shaft 138, the operator presses the push button 230 against the biasing force of the wire spring 216 to move the catch 220 to align the central aperture of the catch 220 with the central bore 192 and out of the groove 150. When the catch 220 is out of the groove 150, the shaft 138 is free to be removed from the adapter.

Figure 22:
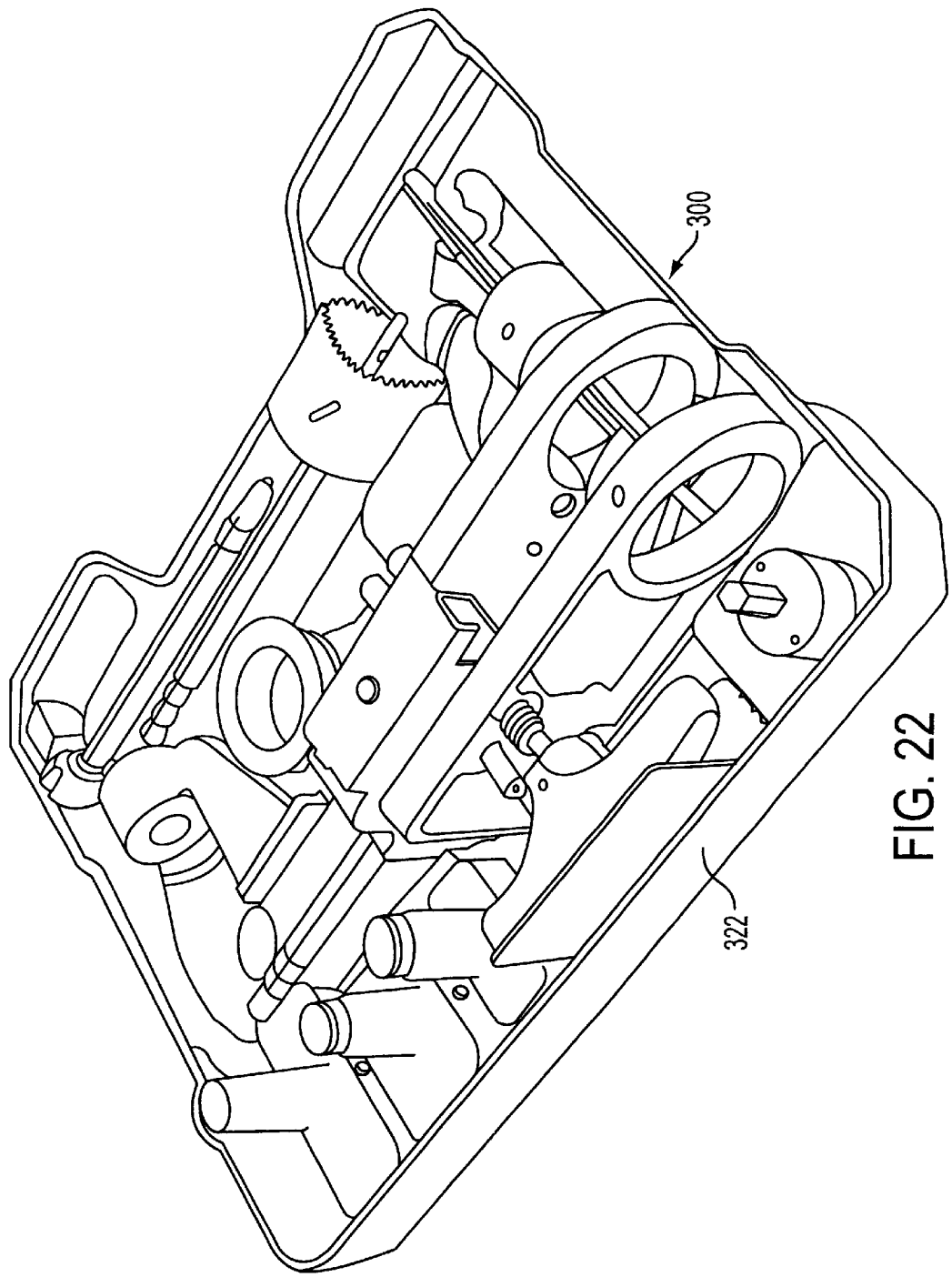
FIG. 22 is a perspective view of a kit including the installation jig of FIG. 1.
Figure 23:
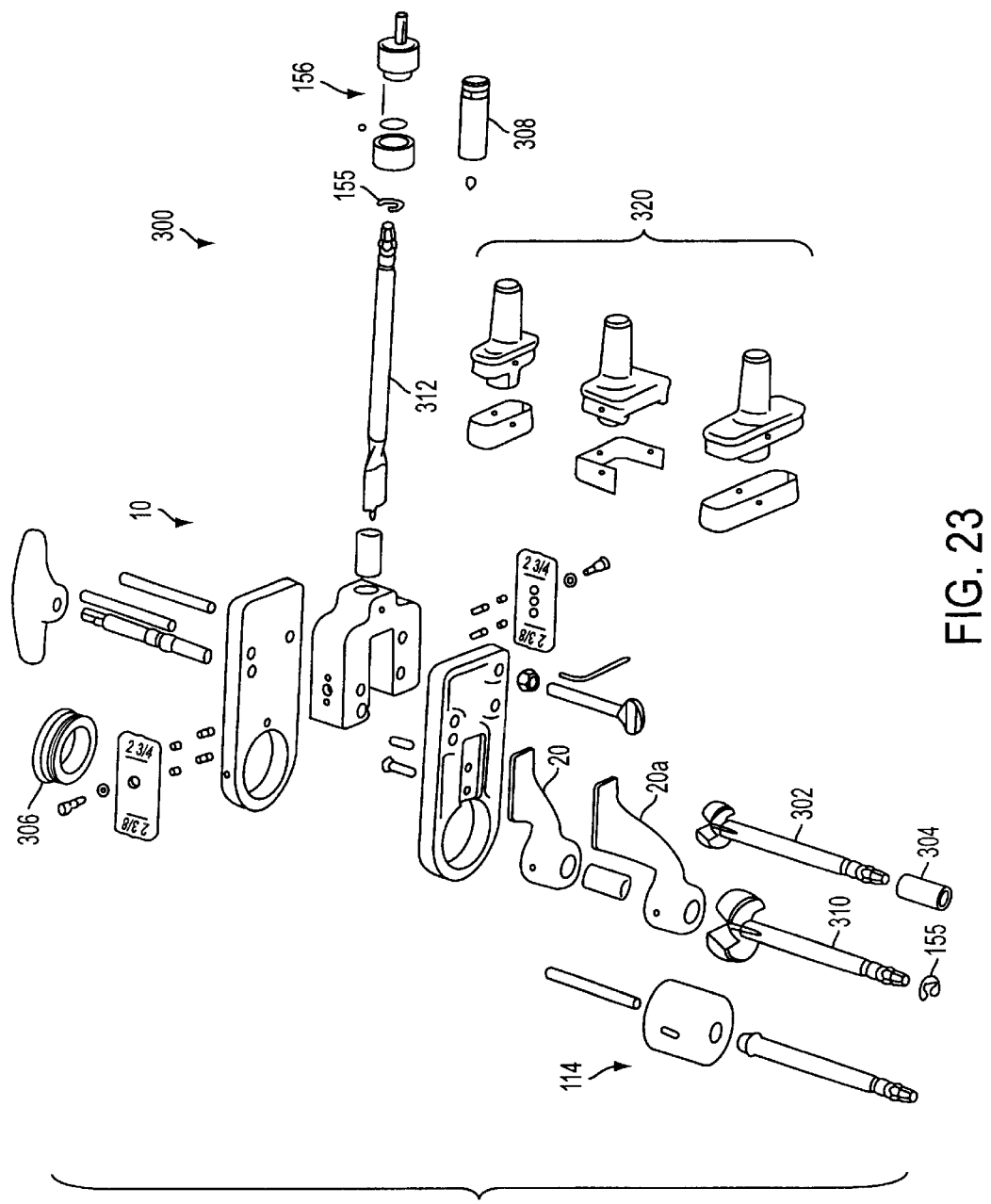
FIG. 23 is an exploded view of the kit.

Preferably, the installation jig 10 of the present invention would be marketed as a part of a kit 300 containing, as illustrated in FIGS. 22–23, the jig 10, a 1½ inch multi-spur bit 302 with a depth stop guide 304 and a 1½ inch ring adapter 306 (for 1½ inch standard door prep), a strike locator 308, in-line arms 20, 20a for wood doors and for metal doors, a 2⅛ inch multi-spur bit 310 for wood doors, a 2⅛ inch hole saw 114 for metal and/or fiberglass doors, a 1-inch spade bit 312, a template measurement guide 314, a drill bit adapter 156, and a plurality of mortising tools 320. In addition, the various pieces of the kit would fit in molded recesses of a carrying case 322 designed for the purpose.

In preferred embodiments, the installation jig is pre-assembled with the first in-line arm 20 attached to the first jaw 12 and with the 2⅛ inch multi-spur bit mounted in the drill guide bore 76. In addition, the 1-inch spade bit is mounted in the latch guide 16. Each bit includes a snap ring 155 installed in the second groove 152 of the bit shaft 138. The snap ring 155 cooperates with the tool head to retain the drill bit its respective bore. With this configuration, the installation jig would be ready for a standard 2⅛ inch door prep.

To proceed with the standard 2⅛ inch door prep, the installer would measure and mark the location for the lockset, rotate the backset spacer to the desired backset, and mount the jig 10 in position on the door. The installer would mount the drill bit adapter 156 in the chuck of a drill and then sequentially insert the spade bit and the multi-spur bit in the drill bit adapter 156 and proceed to drill the necessary latch and lockset holes in the door.

If the installer wants to perform a standard 1½ inch door prep, the installer would remove the 2⅛ inch multi-spur bit by removing the snap ring from the shaft of the 2⅛ inch bit and pull the shaft through the guide bore 76 in the in-line arm 20. Likewise, the installer would remove the snap ring from the shaft of the 1½ inch bit, mount the 1½ inch bit in the guide bore 76, and remount the snap ring on the 1½ inch bit. In addition, the installer would insert the 1½ inch ring adapter in the second jaw 14 and retain it in place with a set screw 157. The installer would then set the backset spacer, mount the jig 10 on the door and proceed with the door prep as described.

In the event that the installer wants to perform a standard 2⅛ inch door prep on a metal or fiberglass door, the installer would remove the retaining screw 94 and remove the first in-line arm 20. The installer would remove the snap ring from the second groove 152 of the hole saw assembly 114, insert the hole saw assembly shaft 138 into the drill guide bore 76 in the second in-line arm 20a and reinstall the snap ring in the second groove 152. The installer would position the second in-line arm 20a in the recess 86 and install the retaining screw 94. With the hole saw assembly 114 mounted on the jig 10, the installer would set the backset, mount the jig 10 on the door and proceed with the door prep as described.

The installation jig 10 has been described with respect to a presently preferred embodiment. However, it will be understood that various modifications can be made within the scope of the invention as claimed below.

What is claimed is:

1. A lockset installation jig comprising:
   a first jaw and a second jaw, the first and second jaws being disposed in a spaced-apart relation and cooperating to retain a door therebetween;
   a latch guide disposed at least partially between the first and second jaws;
   a backset adjuster coupled to the first and second jaws and the latch guide;
   a first removable in-line arm coupled to the first jaw at a first location and including a first guide bore, the first in-line arm defining a first distance between the first guide bore and the door; and
   a backset spacer coupled to the one of the first jaw and the second jaw and the latch guide for movement between a first backset position and a second backset position.

2. The installation jig of claim 1 further including a second removable in-line arm having a second guide bore, the second in-line arm defining a second distance between the second guide bore and the door.

3. The installation jig of claim 2 wherein the second removable in-line arm is coupled to the first jaw at the first location in place of the first in-line arm.

4. The installation jig of claim 2 wherein the first jaw includes a recess and the first and second in-line arms include a base portion configured to fit in the recess when coupled to the first jaw.

5. A lockset installation jig comprising:
 a first jaw and a second jaw, the first and second jaws being disposed in a spaced-apart relation and cooperating to retain a door therebetween;
 a latch guide disposed at least partially between the first and second jaws;
 an adjuster coupled to the first and second jaws and the latch guide;
 a first removable in-line arm coupled to the first jaw at a first location and including a first guide bore, the first in-line arm defining a first distance between the first guide bore and the door; and
 a backset spacer coupled to the one of the first jaw and the second jaw and the latch guide for movement between a first backset position and a second backset position, the backset spacer being coupled to the latch guide for rotational movement between the first backset position and the second backset position.

6. The installation jig of claim 5 wherein the backset spacer includes a detent mechanism for retaining the backset in the first backset position.

7. A lockset installation jig comprising:
 a first jaw and a second jaw, the first and second jaws being disposed in a spaced-apart relation and cooperating to retain a door therebetween;
 a latch guide disposed at least partially between the first and second jaws;
 an adjuster coupled to the first and second jaws and the latch guide;
 a first removable in-line arm coupled to the first jaw at a first location and including a first guide bore, the first in-line arm defining a first distance between the first guide bore and the door; and
 a backset spacer coupled to the one of the first jaw and the second jaw and the latch guide for movement between a first backset position and a second backset position, the backset spacer including indicia for indicating the amount of backset.

8. A lockset installation jig comprising:
 a first jaw and a second jaw, the first and second jaws being disposed in a spaced-apart relation and cooperating to retain a door therebetween;
 a latch guide disposed at least partially between the first and second jaws;
 an adjuster coupled to the first and second jaws and the latch guide and including a threaded screw and a dowel pin, the screw and pin being coupled to the first and second jaws and to the latch guide;
 a first removable in-line arm coupled to the first jaw at a first location and including a first guide bore, the first in-line arm defining a first distance between the first guide bore and the door; and
 a backset spacer coupled to the one of the first jaw and the second jaw and the latch guide for movement between a first backset position and a second backset position.

9. A lockset installation jig comprising:
 a first jaw and a second jaw, the first and second jaws being disposed in a spaced-apart relation and cooperating to retain a door therebetween;
 a latch guide disposed at least partially between the first and second jaws;
 an adjuster coupled to the first and second jaws and the latch guide;
 an in-line arm coupled to the first jaw for aligning a drill bit; and
 a rotatable backset spacer coupled to the one of the first jaw and the second jaw and the latch guide for rotational movement between a first backset position and a second backset position.

10. The installation jig of claim 9 wherein the rotatable backset spacer includes a first rotatable backset spacer and a second rotatable backset spacer, the first backset spacer being coupled to a first surface and the second backset spacer being coupled to a second surface.

11. The installation jig of claim 9 wherein the rotatable backset spacer further includes a detent mechanism to retain the backset spacer in one of the first backset position and the second backset position.

12. The installation jig of claim 9 wherein the rotatable backset spacer further includes indicia for indicating an amount of backset.

13. The installation jig of claim 9 wherein the in-line arm includes a first removable in-line arm coupled to the first jaw at a first location.

14. The installation jig of claim 10 wherein the first removable in-line arm includes a second removable in-line arm coupled to the first jaw at the first location in place of the first removable in-line arm.

15. The installation jig of claim 9 wherein the first jaw includes a recess and the in-line arm includes a base portion is positioned in the recess for coupling to the first jaw.

16. The installation jig of claim 15 wherein the in-line arm includes a first removable in-line arm and a second removable in-line arm.

17. A method of using a lockset installation jig comprising the steps of:
 providing a lockset installation jig having first and second jaws, a removable first in-line arm coupled to the first jaw at a first location, and at least one backset spacer;
 removing the first in-line arm having a first boring axis;
 mounting a second in-line arm having a second boring axis at the first location with the second boring axis being coaxially aligned with the first boring axis; and
 mounting the installation jig on a door.

18. The method of claim 17 wherein the at least one backset spacer includes a first backset spacer and a second backset spacer, the first backset spacer being coupled to a first surface of the installation jig and the a second backset spacer being coupled to a second surface of the installation jig.

19. The method of claim 18 wherein each of the first and second backset spacers includes a detent mechanism for retaining the backset spacer in one of a first position and a second position.

20. The method of claim 17 wherein the first in-line arm includes a first supporting arm and the second in-line arm includes a second supporting arm, the first supporting arm and the second supporting arm having different lengths.

21. The method of claim 17 further including the step of setting the at least one backset spacer to a desired backset wherein the step of setting the at least one backset spacer includes the step of rotating the backset from a first backset position to a second backset position.

22. The method of claim 17 wherein the first in-line arm includes a first base portion and the second in-line arm includes a second base portion substantially similar to the first base portion and the first location includes a first recess, the first base portion being disposed in the recess when the first in-line arm is coupled to the first jaw and the second base portion being disposed in the recess when second in-line arm is coupled to the first jaw.

23. An installation jig comprising:
a first jaw and a second jaw, the first and second jaws being disposed in a spaced-apart relation;
a latch guide disposed at least partially between the first and second jaws;
an adjustment mechanism coupled to the first and second jaws and the latch guide;
a first removable in-line arm coupled to the first jaw at a first location;
a second removable in-line arm coupled to the first jaw in place of the first removable in-line arm; and
a pair of backset spacers rotatably coupled to the latch guide for movement between a first position and a second position, the first and second positions corresponding to a first backset and a second backset, respectively.

24. An installation jig kit comprising:
an installation jig including a first jaw, a second jaw, a latch guide and an adjusting mechanism coupled to the first jaw, the second jaw and the latch guide;
a plurality of hole boring tools;
a first in-line arm having a first guide bore axis and a second in-line arm having a second guide bore axis operatively aligned coaxially with the first guide bore axis;
at lease one backset spacer; and
a drill bit adapter.

25. The installation jig kit of claim 24 wherein the plurality of hole boring tools includes a plurality of tools for providing a standard 1½ inch door prep.

26. The installation jig kit of claim 25 wherein the plurality of tools includes a 1½ inch adapter ring and a 1½ inch multi-spur bit.

27. The installation jig kit of claim 24 wherein the plurality of hole boring tools includes a plurality of tools for providing a standard 2⅛ inch door prep.

28. The installation jig kit of claim 27 wherein the plurality of tools includes a 2⅛ inch multi-spur bit and a 2⅛ inch hole saw.

29. The installation jig kit of claim 24 wherein the at least one backset spacer includes a first backset spacer and a second backset spacer, the first backset spacer and the second backset spacer being mounted to the latch guide for rotational movement between a first backset position and a second backset position.

30. The installation jig kit of claim 24 wherein the drill bit adapter includes:
a body having a longitudinal axis and channel disposed in parallel spaced-apart relation to a longitudinal axis;
a cap coupled to the body, the body and cap cooperating to define a catch-receiving cavity therebetween;
a catch disposed in the cavity;
a spring disposed in the channel and having a first end coupled to the body and a second end extending into the cavity and engaging the catch; and
a push button disposed to actuate the catch.

31. The installation jig kit of claim 24 further comprising:
a carrying case;
a strike locator;
a 1 inch spade bit;
a plurality of mortising tools; and
a template measurement guide.

32. The installation jig kit of claim 24 wherein each one of the plurality of boring tools includes a working head and a shaft, the shaft including a pair of parallel grooves, a first groove being configured to receive a snap ring to cooperate with the working head to retain the shaft on the installation jig and a second groove being configured to engage a drill bit adapter to couple the boring tool to a drill.

* * * * *